United States Patent Office 3,506,512
Patented Apr. 14, 1970

3,506,512
BONDING AND DYEING OF THERMOPLASTIC SYNTHETIC MATERIALS
Ronald S. Goy, Sutton Coldfield, England, assignor to The Dunlop Company Limited, London, England, a British company
No Drawing. Filed Feb. 6, 1967, Ser. No. 613,991
Claims priority, application Great Britain, Feb. 1, 1966, 4,287/66
Int. Cl. B29h 9/10; D06m 13/02
U.S. Cl. 156—110                    4 Claims

ABSTRACT OF THE DISCLOSURE

A process to render the surface of thermoplastic synthetic materials amenable to bonding to vulcanizable elastomeric compositions, in which the material is treated at normal temperatures with a liquid which is not a solvent for the material at normal temperatures but is a solvent at elevated temperatures.

The liquid, while on the surface of the material, is heated to a temperature at which it is a solvent for the material but at which the material does not melt, and left in contact with the material until the surface of the material, when viewed in the absence of the liquid, has a matt appearance.

---

This invention relates to the bonding of thermoplastic synthetic materials to vulcanizable elastomeric compositions, and more particularly to a process for treating the surface of a thermoplastic synthetic material to render it amenable to bonding to a vulcanizable elastomeric composition.

According to the present invention a process for treating the surface of a thermoplastic synthetic material to render it amenable to bonding to a vulcanizable elastomeric composition comprises applying to the surface of the thermoplastic material a liquid which is a solvent for the material at elevated temperatures only, the liquid being at a temperature below that at which it is a solvent for the material, and heating said liquid to a temperature at which it is a solvent for the material but which is below the melting point of the material for a period of time such that if subsequently freed from the liquid the surface has a matt appearance.

The present invention is particularly useful for treating the surfaces of thermoplastic materials of high molecular weight, such as polypropylene or high density polyethylene to render them amenable to bonding to vulcanizable natural or synthetic rubber compositions. For many purposes a composite material made by laminating a high melting point thermoplastic material such as polypropylene with natural rubber or elastomer would be very useful due to the desirable properties of the thermoplastic material. For example, the composite material can be used in many situations in which it is subjected to a high temperature which would melt polymers of low melting point such as low density polyethylene. Unfortunately, it has been found very difficult, if not impossible, to produce a satisfactory bond between the thermoplastic material and the elastomer. The present invention obviates this difficulty in that it provides the thermoplastic material with a surface which is readily bonded to elastomeric compositions.

The liquid which comprises a solvent for the thermoplastic material at an elevated temperature is applied to the material at a temperature below that at which it is a solvent for the material. The liquid can conveniently be applied at room temperature. The liquid can be applied by any suitable method such as spraying, or by means of rollers, or, if the thermoplastic material is in a suitable form, by dipping or padding. The liquid used to treat the thermoplastic material depends to some extent upon the particular thermoplastic material being treated; for example, when isotactic polypropylene or a copolymer of ethylene and propylene is treated it is preferred to use a liquid hydrocarbon, or mixture of hydrocarbons, which is liquid at ordinary temperatures and at the elevated temperatures at which it is a solvent for the material. Examples of suitable solvents are toluene, xylene, white spirit, heavy coal tar naphtha, kerosene, pinene and turpentine. Aliphatic ketones of suitably high boiling point, especially cyclic ketones, for example cyclohexanone, can be used with advantage. With polymers containing a high proportion of chlorine atoms, for example polyvinyl chloride and thereof with chlorinated polyethylene, it is preferred to employ a chlorinated hydrocarbon solvent, especially chlorinated aromatic hydrocarbons such as chlorobenzene. If desired, the solvent may contain a pigment or dye which is deposited on the thermoplastic material when the solvent is removed. The material thus becomes dyed since the treated surface of the material is usually amenable to dyeing by the deposited dye.

After application to the thermoplastic synthetic material the liquid is heated to a temperature at which it is a solvent for the thermoplastic material. Heating can be effected in any suitable manner such as by passing the coated thermoplastic material through an oven, but preferably the heating is effected extremely rapidly by passing the treated thermoplastic material through a heated bed of fluidized solid particles. Heating by means of a bed of fluidized particles is usually carried out by immersing the material in the bed of fluidized solid particles or by drawing the material through the bed. If desired, the material may be maintained at an elevated temperature in the space above the bed, and a suitable apparatus for this purpose is described and claimed in our United Kingdom Patent No. 978,013.

The time for which the liquid is heated at the elevated temperature will vary to some extent depending upon the particular thermoplastic material employed, the solvent, and the method of heating but it is preferred to heat the material for a very short period of time, for example less than 30 seconds. It is preferred to use a very efficient heating medium and for this reason, it is preferred to heat the coated material in a bed of fluidized solid particles since the time required in this case may be as little as 2 seconds and is seldom greater than 20 seconds.

The fluid bed heating technique is also advantageous in the case where the thermoplastic material is treated in a continuous process since in view of the very short time required for heating the material the latter can be passed rapidly through the fluid bed at a constant speed. A suitable continuous process would comprise passing the thermoplastic synthetic material through a bath of the liquid and directly from the bath through a fluid bed apparatus. If desired, means such as a mangle may be provided to remove excess liquid from the material prior to passing the material through the fluid bed.

The temperature at which the liquid is heated will vary with the particular thermoplastic material employed and upon the particular solvent since the treatment is intended to affect only the surface of the material. After the treatment has continued for the required period of time, i.e. it is found by test that on removal of the liquid the surface of the material has a matt appearance, any excess liquid can be removed from the thermoplastic material. The liquid may be removed, for example, by passing the treated thermoplastic material between cooled rollers, by washing it with cold water, or by evaporation of the liquid. In the case where the thermoplastic material is washed with water it can be subsequently air dried at room temperature or at an elevated temperature which, however, should preferably not exceed about 60° C., at least where the thermoplastic material is polypropylene. It is to be understood that complete removal of the solvent is not essential but the amount remaining should not be sufficient to dissolve appreciably the thermoplastic material when this is subsequently heated, for example during vulcanization of an elastomeric composition to bond it to the treated thermoplastic material. The effect produced by the solvent treatment is long lasting at ordinary temperatures; for example, a treated polypropylene yarn will still bond strongly to natural rubber after storage for 90 days, providing it is kept clean during that time.

Bonding of the treated thermosplastic synthetic material to an elastomeric composition may be effected by placing the two materials in contact, or by embedding the treated thermoplastic synthetic material in the elastomeric composition, and subjecting the assembly to heat and pressure. The temperature employed must be sufficiently high to effect vulcanization of the elastomeric composition and normal vulcanizing temperatures appropriate to the particular elastomeric composition will normally be employed. However, the vulcanization temperature must normally be below the softening point of the thermoplastic material and will therefore depend to some extend on the thermoplastic material used. For this reason, it is preferred to use thermoplastic materials having high melting points, for example, melting points above 160° C., since rubber compositions are commonly vulcanized at this temperature.

Different vulcanizing ingredients as appropriate to the particular elastomeric composition may be used including, for example, sulphur and peroxide vulcanizing agents. Conventional additives such as accelerators, fillers and antioxidants may also be present in the elastomeric compositions and, if desired, also in the thermoplastic material. During the vulcanization the effect of the solvent treatment on the thermoplastic material is reversed and those parts of the surface of the thermoplastic material which are not bonded to the elastomeric composition revert to their usual non-polar hydrophobic state in which they are not amenable to bonding to elastomeric compositions. Thus, the valuable surface properties of the thermoplastic material are not lost or diminished by the solvent treatment and subsequent bonding. This is important in cases where the thermoplastic material has one surface exposed, but is not so important in cases where the thermoplastic material, for instance in filament form, is embedded in the elastomeric composition.

A variety of thermoplastic synthetic materials may be treated by the process of the present invention. Examples of suitable thermoplastic materials are polypropylene (especially isotactic polypropylene), high density polyethylene, ethylene-propylene copolymers, polycarbonates, polyvinyl chloride, pentaerithritol polymers, polyamides, polyesters (e.g. polyethylene terephthalates) and acrylic polymers. The thermoplastic material may be in a variety of forms, for instance, sheets, films, fibres, filaments, yarns, cords and woven or non-woven fabrics. A particularly suitable material is a material such as polypropylene which has been elongated under conditions whereby the molecules of the polymer have become oriented in the direction of elongation to yield a film, the form for instance of a tape, which is fibrillatable upon being subjected to stress. The fibrillated material is in effect an assembly of substantially parallel filaments in side-by-side relationship. Alternatively, the film can be fibrillated by twisting in which case the resulting yarn has the appearance of a yarn obtained by twisting together a number of parallel filaments. It is to be understood that the material may be treated with solvent and, if desired, bonded to the elastomeric composition prior to or subsequent to fibrillation thereof.

The vulcanizable elastomeric composition should be compatible with the thermoplastic material, and is regarded as being compatible with the thermoplastic material if it does not differ from the thermoplastic material, for example in polarity, crystallite structure or spatial configuration, to such an extent that it is not possible to produce a reasonably strong direct bond between them. The elastomeric composition can be a composition of natural or any synthetic rubber which is compatible with the thermoplastic material. Examples of suitable synthetic rubbers are polybutadiene, copolymers of butadiene with styrene or acrylonitrile, polychloroprene or polybutadiene. Elastomeric resins such as polyvinyl chloride or polyurethanes may also be used. Mixtures or blends of one or more elastomers may be used.

Synthetic thermoplastic materials such as polypropylene are extremely difficult to dye by conventional methods. The only successful methods so far employed are by modification of the actual polymer by melt pigmentation or by adding to the polymer metal complexes which are dye receptive.

Treatment of the polymer (e.g. polypropylene) to improve its adhesion to rubber by treating with a solvent such as white spirit or trichloroethylene as in the present invention can render the polymer amenable to dyeing. The dyestuff, say in the form of a pigment, can be dissolved in the treatment liquid, and applied with the liquid. The dyestuff can be applied as a second application after the solvent treatment but before the heat treatment. Fixation of the dye can then occur during the heat treatment. Alternatively, the dye application can take place as a second step after surface etching by the solvent and heat treatment.

The present invention is advantageous in that it facilitates a high degree of control over the extent to which the thermoplastic material is dissolved in the solvent. It has been found that if the thermoplastic material in the form of fine yarns or thin films is passed directly into a bath containing heated solvent a very rapid dissolution of the thermoplastic material results, and the material may be completely dissolved in the hot solvent unless great care is taken to prevent this. The present invention provides a process which can be carried out continuously and yet in which excessive dissolution of the thermoplastic material can be avoided, since the correct amount of solvent to effect the desired treatment can be applied to the thermoplastic material prior to heating thereof, i.e. an excess of the solvent can be avoided.

The invention is illustrated by the following examples.

EXAMPLE I

As a control fibrillatable polypropylene tape of width 0.25 inch and thickness 0.004 inch was twisted to give 2.2 turns per inch. The polypropylene tape had been elongated prior to twisting so that the molecules thereof had been oriented in the direction of elongation and the tape was fibrillatable. The twisted tape, which was in the form of a yarn, was embedded in a vulcanizable natural rubber composition which was then vulcanized. The adhesion of the yarn to the vulcanized rubber composition was then determined. The rubber composition was compounded to the following formula:

| | Parts by weight |
|---|---|
| 13/20 natural rubber | 100.0 |
| Carbon black | 45.0 |
| Pine tar | 4.0 |
| Mineral oil 38/A | 6.0 |
| Stearic acid | 1.0 |
| Zinc oxide | 6.0 |
| Vulcatard A | 0.5 |
| Sulphur | 2.6 |
| Santocure M.O.R. | 0.7 |

The carbon black used was general purpose furnace carbon black.

Vulcatard A and Santocure M.O.R., are respectively trade names for the vulcanization retarder N-nitroso diphenylamine and the vulcanization accelerator 2-(4-morpholine mercapto)-benzthiazole.

The above procedure was repeated except that prior to embedding the yarn in the vulcanizable rubber composition, the yarn was passed through a bath of white spirit at room temperature (20° C.) and then through a bed of fluidized glass particles (known as Ballotini) heated at 130° C. The yarn was immersed in the fluid bed for 8 seconds and was then allowed to cool. The white spirit was removed by evaporation during passage of the material through the bed of fluidized glass particles.

A second repeat was performed in which the polypropylene tape prior to twisting was treated with white spirit as described above, and the treated tape was then twisted to give 2.2 turns per inch prior to embedding it in the vulcanizable natural rubber composition.

The denier, tenacity (in gms. per denier) and adhesion to the vulcanized natural rubber composition (in pounds) of each yarn is given in Table 1 below. The adhesion figure quoted is the force required to pull the cord (yarn) from a vulcanized natural rubber block 1 cm. long.

TABLE 1

| Yarn | Denier | Tenacity (g.p.d.) | Adhesion (lb.) |
| --- | --- | --- | --- |
| Untreated | 3,500 | 5.3 | 5.1 |
| Treated in twisted form | 3,500 | 5.4 | 11.4 |
| Treated in untwisted form | 3,500 | 5.3 | 10.2 |

These results show that the tenacity of the polypropylene yarn was not affected by the solvent treatment but the adhesion of the treated yarn to the rubber composition was far superior to the adhesion of the untreated yarn.

EXAMPLE II

The procedure outlined in Example I was repeated but using a multifilament polypropylene yarn twisted to 2.2 turns per inch (available under the trade name Ulstron) instead of the fibrillatable tape of Example I. The results are shown in Table 2 below.

TABLE 2

| Yarn | Denier | Tenacity (g.p.d.) | Adhesion (lb.) |
| --- | --- | --- | --- |
| Untreated | 3,000 | 8.0 | 7.1 |
| Treated | 3,000 | 7.8 | 9.3 |

These results again show that the tenacity of the yarn is not appreciably affected by the solvent treatment but the adhesion of the yarn is improved.

EXAMPLE III

The process of Example I was repeated except that the polypropylene tape was one twisted to give 2.0 instead of 2.2 turns per inch, and the immersion in the fluid bed was for six seconds at 165° C., instead of for eight seconds at 130° C. The treated tape was subsequently bonded in natural rubber and the adhesion tested as described in Example I. The results obtained were as follows:

TABLE 4

| Yarn | Denier | Tenacity (g.p.d.) | Adhesion (lb.) |
| --- | --- | --- | --- |
| Untreated | 3,240 | 5.4 | 4.2 |
| Treated | 3,240 | 5.0 | 6.9 |

This shows that yarn wetted by solvent can be immersed in the fluid bed at the melting point temperature (165° C.) of polypropylene for a short period of time without affecting the tenacity of the yarn. The result also shows an improvement in adhesion affected by the treatment.

EXAMPLE IV

A package of untwisted 1140 denier (5 denier per filament) polypropylene yarn was passed over a licking roller revolving in a bath containing white spirit. The yarn then passed through a solution of dye made up to the following recipe:

60 gms./litre Palanil Blue R liquid
50 gms./litre urea
2 gms./litre Manutex P. 946 (Sodium Alginate)
2 gms./litre Lissapol N wetting agent The yarn was then passed through a pad mangle with an expression of 20% and into a fluidized bed at 150° C., for 6 seconds. On leaving the bed it passed through three washing baths, the first for 5 minutes in water at 50° C., the second for 5 minutes in 0.2% Lissapol N solution at 70° C., and the third in cold water. It was partially dried in warm air at 60° C., and finally through a second fluidized bed at 150° C. for 2 seconds.

The resulting dyed yarn had a good fastness.

Having now described my invention, what I claim is:

1. A process for treating the surface of a thermoplastic synthetic material to render it amenable to bonding to a vulcanizable elastomeric composition, comprising applying a liquid which is a solvent for said material at elevated temperatures to said surface, said liquid being at a temperature below that at which it is a solvent for said material; and passing said material through a hot fluid bed to heat said liquid to a temperature at which it is a solvent for said material but which is below the melting point of said material for a period of time sufficient to produce a matt appearance on said surface if subsequently freed from said liquid.

2. A process according to claim 1, in which said fluid bed comprises a bed of glass beads.

3. A process for treating the surface of a thermoplastic synthetic material to render said surface amenable to bonding to a vulcanizable elastomeric composition, said thermoplastic synthetic material being selected from the group consisting of a propylene polymer, a propylene copolymer, an ethylene polymer, and an ethylene copolymer, comprising applying white spirit which is a solvent for said material at elevated temperatures to said surface, said white spirit being at a temperature below that at which it is a solvent for said material; and heating said white spirit to a temperature at whch it is a solvent for said material but which is below the melting point of said material for a period of time sufficient to produce a matt appearance on said surface if subsequently freed from said white spirit.

4. A process for treating the surface of a thermoplastic material to render it amenable to bonding to a vulcanizable elastomeric composition comprising applying a liquid which is a solvent for said material at elevated temperatures to said surface, said liquid being at a temperature below that at which it is a solvent for said material; heating said liquid to a temperature at which it is a solvent for said material but which is below the melting point of said material for a period of time sufficient to produce a matt appearance on said surface if subsequently freed from said liquid; bringing said surface into intimate contact with a vulcanizable elastomeric composition; and after shaping, if necessary, said composition, subjecting same to vulcanizing conditions whereby said material is bonded with said composition into a composite article.

References Cited

UNITED STATES PATENTS

| | | | |
| --- | --- | --- | --- |
| 2,693,995 | 11/1954 | Hannay et al. | 8—115.5 XR |
| 3,236,586 | 2/1966 | Humphreys | 8—130.1 |
| 3,236,587 | 2/1966 | Genereux | 8—130.1 |
| 3,239,304 | 3/1966 | Joly | 8—115.5 XR |

BENJAMIN A. BORCHELT, Primary Examiner

STEPHEN C. BENTLEY, Assistant Examiner

U.S. Cl. X.R.

8—130.1; 117—162